United States Patent
Asai et al.

[11] Patent Number: 5,835,276
[45] Date of Patent: Nov. 10, 1998

[54] OPTICAL SYSTEM HAVING COMPOUND PRISM DESIGN TO REDUCE GHOSTS AND PLARES

[75] Inventors: Tetsuhisa Asai, Sagamihara; Masashi Hankawa, Koza-gun; Yoshihiro Matsumoto, Inagi, all of Japan

[73] Assignee: Olympus Optical Co., Ltd., Tokyo, Japan

[21] Appl. No.: 801,995

[22] Filed: Feb. 18, 1997

[30] Foreign Application Priority Data

Feb. 21, 1996 [JP] Japan .................................. 8-033768

[51] Int. Cl.$^6$ ............................ G02B 27/14; G02B 27/12
[52] U.S. Cl. ............................................. 359/638; 359/640
[58] Field of Search .................................. 359/638, 640, 359/634, 831

[56] References Cited

U.S. PATENT DOCUMENTS

| | | | |
|---|---|---|---|
| 4,113,354 | 9/1978 | Yamasita et al. ........................ | 359/636 |
| 4,701,772 | 10/1987 | Anderson et al. ....................... | 346/160 |
| 5,066,101 | 11/1991 | Aoki et al. ............................... | 359/638 |
| 5,243,465 | 9/1993 | Fein ........................................ | 359/636 |

*Primary Examiner*—Georgia Y. Epps
*Assistant Examiner*—Ricky Mack
*Attorney, Agent, or Firm*—Louis Weinstein

[57] ABSTRACT

A prism optical system provided with: a first prism on which a light ray coming from an objective lens is incident; a second prism on which the light ray coming from this first prism is incident, and from which this incident light ray is emitted; and a plate-like member which is interposed between the aforesaid prisms so as to provide a predetermined air space therebetween and which has a diaphragm opening and a light blocking portion. Further, an uneven portion, which consists of depressions and projections and has a serrate section, for preventing light rays, which have been reflected from the surface of the light blocking portion of this plate-like member, from entering a field stop is provided in the light blocking portion thereof. Thereby, occurrences of ghosts and flares due to stray light are prevented. Moreover, ghosts and flares are reduced.

21 Claims, 9 Drawing Sheets

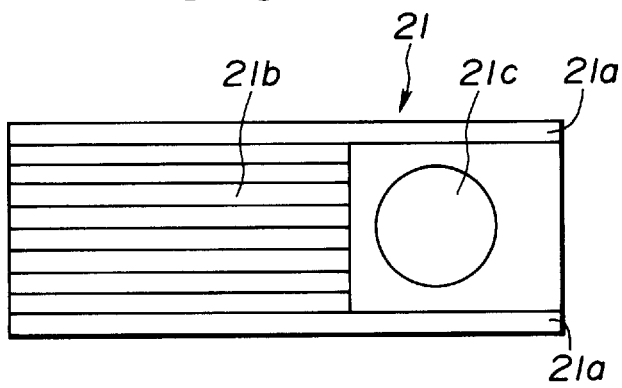
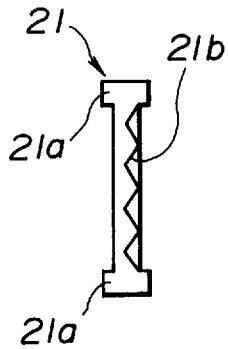
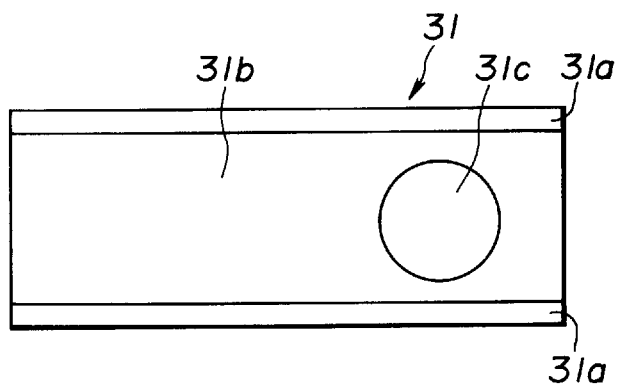
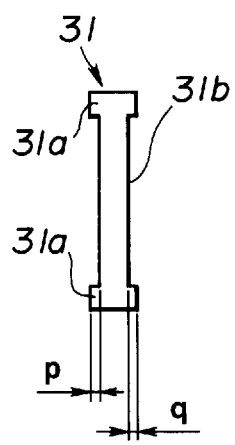
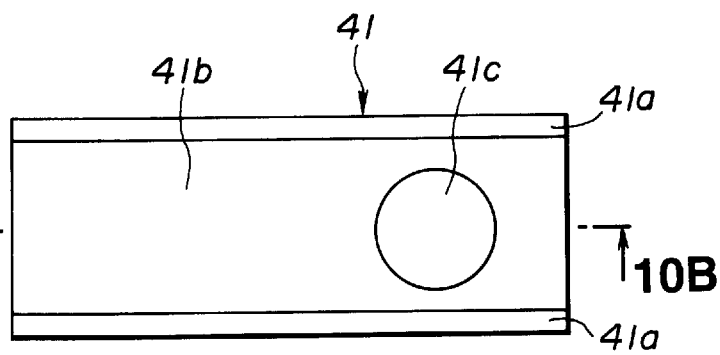
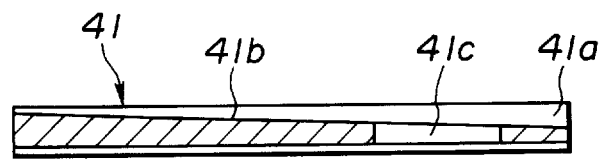

OPTICAL SYSTEM HAVING COMPOUND PRISM DESIGN TO REDUCE GHOSTS AND PLARES

BACKGROUND OF THE INVENTION

1. Field of the Invention

This invention generally relates to a compound (or composite) prism optical system and, more particularly, to a compound prism optical system provided with a plate-like member which is interposed between two prisms so as to provide an air space therebetween.

2. Description of the Related Art

For example, the Pechan prism used as an erecting system of a binocular or the like is an optical system constituted by a combination of two prisms including a Dach-prism (namely, a Dachkantantprisma or a roof (or Amici) prism). Further, a plate-like member serving to form an air layer is provided between these two prisms.

Such a conventional plate-like member will be described hereinbelow by referring to FIGS. 12A and 12B. FIG. 12A is a front view of the plate-like member. FIG. 12B is a side view of the plate-like member.

This plate-like member 91 is shaped nearly like a rectangle. Further, a pair of abutting attachment portions (namely, abutting connection or joint portions) 91a are formed along the edge portions of the longer sides of this plate-like member 91, respectively. There is provided a light blocking portion (namely, a shading or shielding portion) 91b between these abutting attachment portions 91a. Further, a circular stop or diaphragm opening 91c, which is a light transmitting portion, is formed in a side portion of this light blocking portion 91b.

The aforementioned abutting attachment portions 91a are configured in such manner as to be much higher than the light blocking portion 91b by heights u and v, respectively. Both of these heights are about 0.1 mm or so.

This plate-like member 91 is disposed in the compound prism optical system in a manner as illustrated in FIG. 13.

In this prism optical system, light rays having been incident from an objective lens 2 impinge on a first prism 4. Then, the light rays are totally reflected on a first reflection surface 4a thereof. Thereafter, the light rays are further reflected on a second reflection surface 4b and a third reflection surface 4c. Subsequently, the reflected light rays pass through the diaphragm opening 91c. Then, the light rays are incident on a second prism 5. After being reflected several times in this second prism 5, the light rays exit from the second prism. Subsequently, the light rays pass through a field stop 3.

The front and rear surfaces of the abutting attachment portions 91a of the plate-like member 91 are made to abut against and are attached to the two prisms 4 and 5, respectively. Thereby, an air layer, whose thickness (or width) is 0.1 mm or so, is formed between the first reflection surface 4a and the light blocking portion 91b. When the angle of incidence is within a predetermined range, the aforementioned total reflection of light rays on the first reflection surface 4a is enabled.

Namely, a part of the first reflection surface 4a of the first prism other than the part, which the abutting attachment portion 91a is made to abut against and is attached to, of the first reflection surface 4a thereof is in contact with the air layer. Therefore, in the case that the angle of incidence of light rays on the former part of the first reflection surface 4a thereof is larger than a critical angle θnl=arcsin (l/nl) (incidentally, nl: the refractive index of the first prism), the aforementioned total reflection occurs.

Thus, the light rays having been incident on the objective lens 2 at an angle, by which an image is formed in the field stop 3, are totally reflected on the first reflection surface 4a in the first prism 4, as illustrated in FIG. 13. Thereafter, the light rays take the following optical path. Namely, after being reflected by the second reflection surface 4b and the third reflection surface 4c, the light rays pass through the diaphragm opening 91c and are then incident on the second prism 5.

As shown in FIGS. 13 and 14, when light rays 6a having impinged upon the objective lens 2 from a direction corresponding to an angle outside a real field of view are incident on the first reflection surface 4a at an angle which is slightly smaller than the total-reflection critical angle θnl, the light rays 6a are transmitted by the aforesaid first reflection surface 4a. Then, the light rays 6a impinge upon the light blocking portion 91b of the plate-like member 91. A part of the light rays 6a are reflected on this light blocking portion 91b in various directions. Light rays reflected in a direction corresponding to a specular (or direct) reflection thereof, at which the intensity thereof is largest, are transmitted again by the first reflection surface 4a and subsequently enter the first prism 4.

At that time, the light rays are refracted. Thereby, the optical path thereof is sometimes shifted by $\delta a_2$ from that in the case that the light rays are reflected on the first reflection surface 4a. Thus, the refracted light rays sometimes pass through the field stop 3 as light rays $6a_2$. Consequently, in the case that an intense or strong light source is present in the real field of view, ghosts or flares due to stray light sometimes occur in the field of view as the aforementioned phenomenon.

OBJECTS AND SUMMARY OF THE INVENTION

Accordingly, a first object of the present invention is to provide a compound prism optical system which reduces unnecessary light.

Further, a second object of the present invention is to provide a compound prism optical system which reduces light unnecessary for forming an image.

Moreover, a third object of the present invention is to provide a compound prism optical system which prevents unnecessary light from reaching an image forming side or reduces unnecessary light.

Furthermore, a fourth object of the present invention is to provide a compound prism optical system which can prevent occurrences of ghosts and flares due to stray light or can reduce ghosts and flares.

In addition, a fifth object of the present invention is to provide a compound prism optical system composing an easy-to-view finder which can prevent occurrences of ghosts and flares due to stray light or can reduce ghosts and flares.

Additionally, a sixth object of the present invention is to provide a prism optical apparatus which is easy to observe and prevents unnecessary light from reaching the image forming side and reduces the unnecessary light.

In brief, to achieve the foregoing objects, in accordance with the present invention, there is provided a prism optical system that comprises: a first prism on which a light ray is incident; a second prism from which the light ray is emitted; and a plate-like member which is interposed between the aforesaid prisms so as to provide an air space therebetween and which has a light transmitting portion adapted to transmit light rays, and a light blocking portion on which are provided a plurality of continuous protrusion and depression (or convex and concave) surfaces (or faces).

Other features, objects and advantages of the present invention will become apparent from the following description of preferred embodiments with reference to the drawings in which like reference characters designate like or corresponding parts throughout several views.

BRIEF DESCRIPTION OF THE DRAWINGS

FIG. 8A is a front view of the plate-like member of a third embodiment of the present invention, for illustrating the configuration of this plate-like member;

FIG. 8B is a side view of the plate-like member of the third embodiment of the present invention, for illustrating the configuration of this plate-like member;

FIG. 9A is a front view of the plate-like member of a fourth embodiment of the present invention, for illustrating the configuration of this plate-like member;

FIG. 9B is a side view of the plate-like member of the fourth embodiment of the present invention, for illustrating the configuration of this plate-like member;

FIG. 10A is a front view of the plate-like member of a fifth embodiment of the present invention, for illustrating the configuration of this plate-like member;

FIG. 10B is a sectional view of the plate-like member of the fifth embodiment of the present invention, for illustrating the configuration of this plate-like member;

DETAILED DESCRIPTION OF THE PREFERRED EMBODIMENTS

Hereinafter, the preferred embodiments of the present invention will be described in detail by referring to the accompanying drawings.

Figure 1:
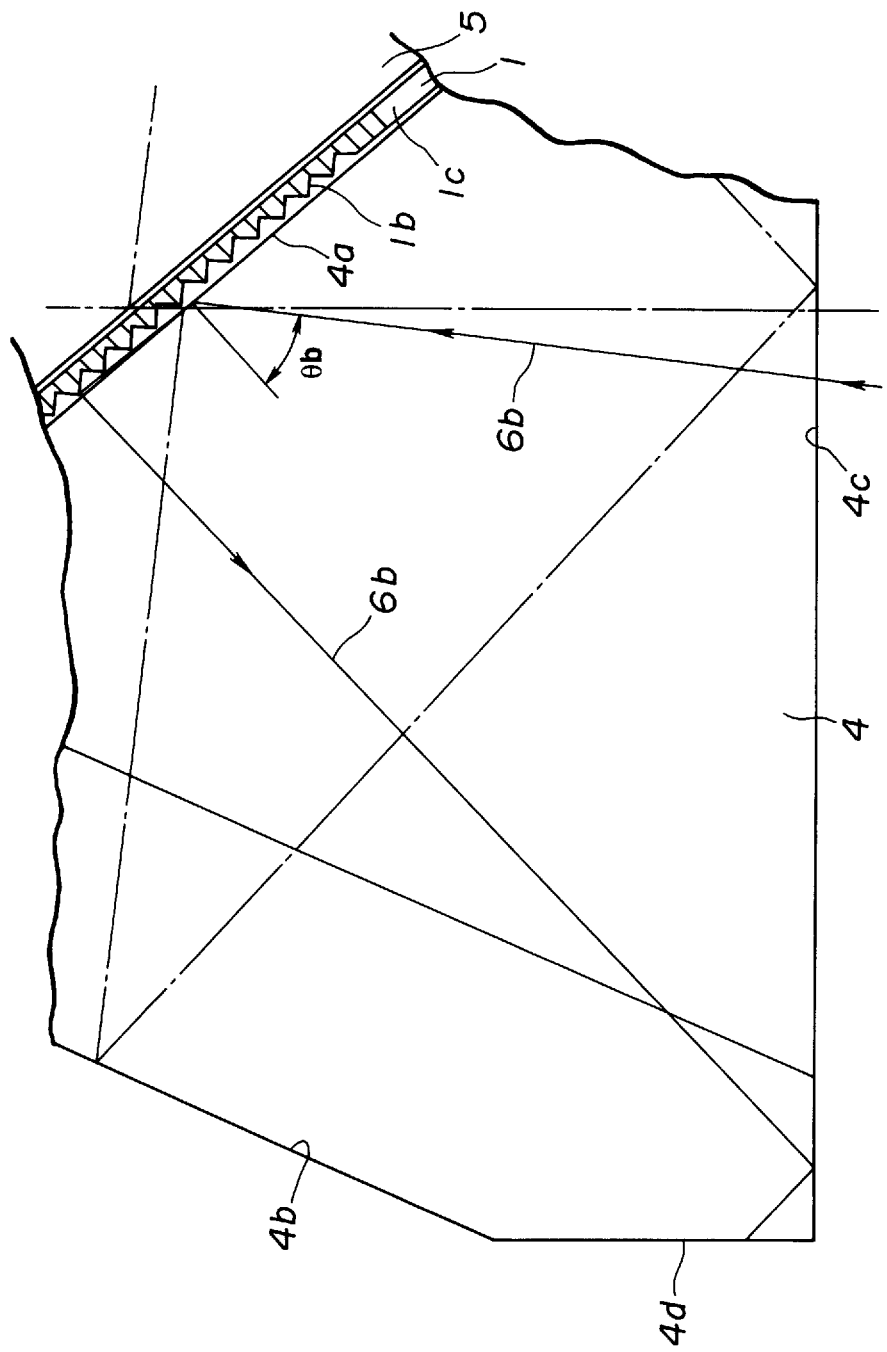
FIG. 1 is a sectional diagram illustrating how light rays are reflected by a plate-like member of a first embodiment of the present invention.
Figure 2A:
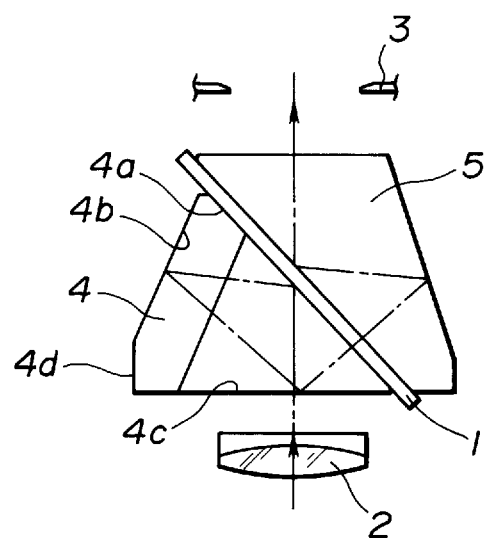
FIG. 2A is a sectional view of an example of a compound prism optical system to which a plate-like member of the first embodiment of the present invention is applied.
Figure 2B:
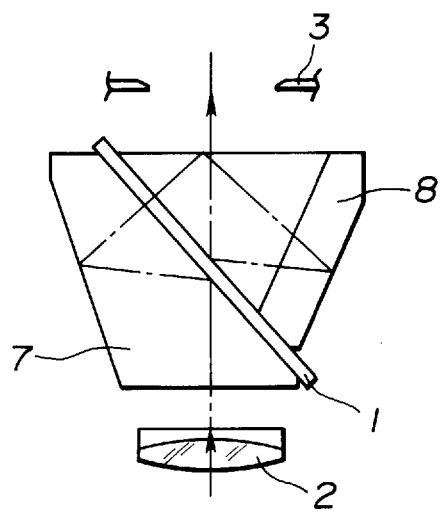
FIG. 2B is a sectional view of another example of the compound prism optical system to which the plate-like member of the first embodiment of the present invention is applied.
Figure 3:
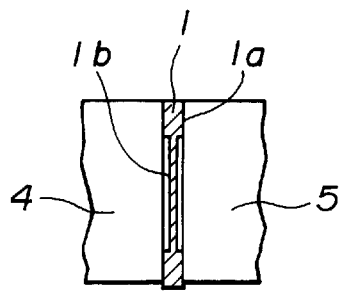
FIG. 3 is an enlarged sectional view of the plate interposed between two prisms in the first embodiment of the present invention.
Figure 4A:
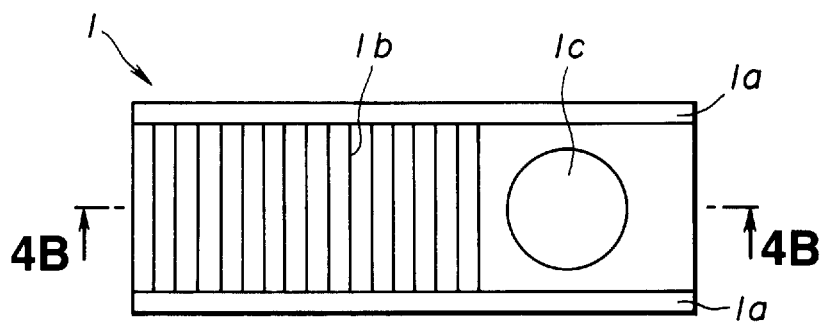
FIG. 4A is a front view of the plate-like member of the first embodiment of the present invention, for illustrating the configuration of this plate-like member.
Figure 4B:
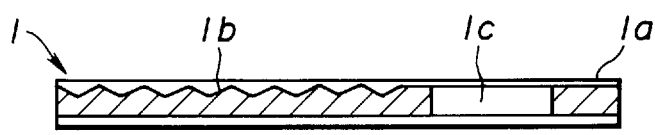
FIG. 4B is a sectional view of the plate-like member of the first embodiment of the present invention, for illustrating the configuration of this plate-like member.

FIGS. 1, 2A, 2B, 3, 4A and 4B illustrate the first embodiment of the present invention. FIG. 1 is a sectional diagram illustrating how light rays are reflected by the plate-like member of the first embodiment of the present invention. FIG. 2A is a sectional view of an example of a compound prism optical system to which the plate-like member of the first embodiment of the present invention is applied. FIG. 2B is a sectional view of another example of the compound prism optical system to which the plate-like member of the first embodiment of the present invention is applied. FIG. 3 is an enlarged sectional view of the plate interposed between two prisms in the first embodiment of the present invention. FIG. 4A is a front view of the plate-like member of the first embodiment of the present invention, for illustrating the configuration of this plate-like member. FIG. 4B is a sectional view of the plate-like member of the first embodiment of the present invention, for illustrating the configuration of this plate-like member.

As illustrated in, for instance, FIG. 2A, a compound prism optical system consists of: an objective lens 2 on which light rays are incident; a first prism 4 having first, and third reflection surfaces 4a and 4b and 4c, which reflect light rays coming from objective lens 2, respectively, and further having a grained surface 4d; a plate-like member 1 mounted on the first reflection surface side 4a of first prism 4; a second prism 5 combined with the aforementioned first prism 4 in such a manner as to put this plate-like member 1 therebetween; and a field stop 3 through which light rays emitted from second prism 5 pass. Further, a Pechan prism is composed of the first prism 4 (namely, the first unit prism (or sub-prism) 4) and the second prism 5 (namely, the second unit prism (or sub-prism) 5).

The aforementioned plate-like member 1 is shaped nearly like a rectangle. Further, a pair of abutting attachment portions 1a are formed along the edge portions of the longer sides of this plate-like member 1, respectively. There is provided a light blocking portion 1b between these abutting attachment portions 1a. Furthermore, a circular diaphragm opening 1c, which is a light transmitting portion, is formed in a side portion of this light blocking portion 1b.

On the blocking portion 1b, a plurality of consecutively arranged light blocking lines are formed. More particularly, depressions and projections, each of which is elongate in the transverse direction of the blocking portion 1b and has a section shaped nearly like a letter "V" or an "inverted V", respectively, are provided in parallel with one another along the longitudinal direction. Thus, as shown in FIG. 4B, the entire portion consisting of these depressions and projections has the section which is approximately serrate.

The inclined faces of the projections and depressions are formed so that a direction, in which the elongated projections and depressions extend, intersects with the first reflection surface 4a. The angles of inclination of the aforesaid inclined faces are set in such a manner that when light rays causing ghosts or flares are incident on the light blocking portion 1b, the light rays are led or guided to the outside of the field stop 3 according to the corresponding angles of incidence, respectively.

Namely, a light ray 6b transmitted by the first reflection surface 4a impinges upon the inclined face formed on the light blocking portion 1b and is then reflected thereon. At that time, among the light rays reflected on the inclined faces, the light ray having the largest intensity is reflected to, for example, the grained surface 4d. Namely, such a light ray is not reflected at an angle at which this reflected light ray would pass through the diaphragm opening 1c. Thus, ghosts or flares due to stray light are never caused in the field stop 3.

Figure 13:
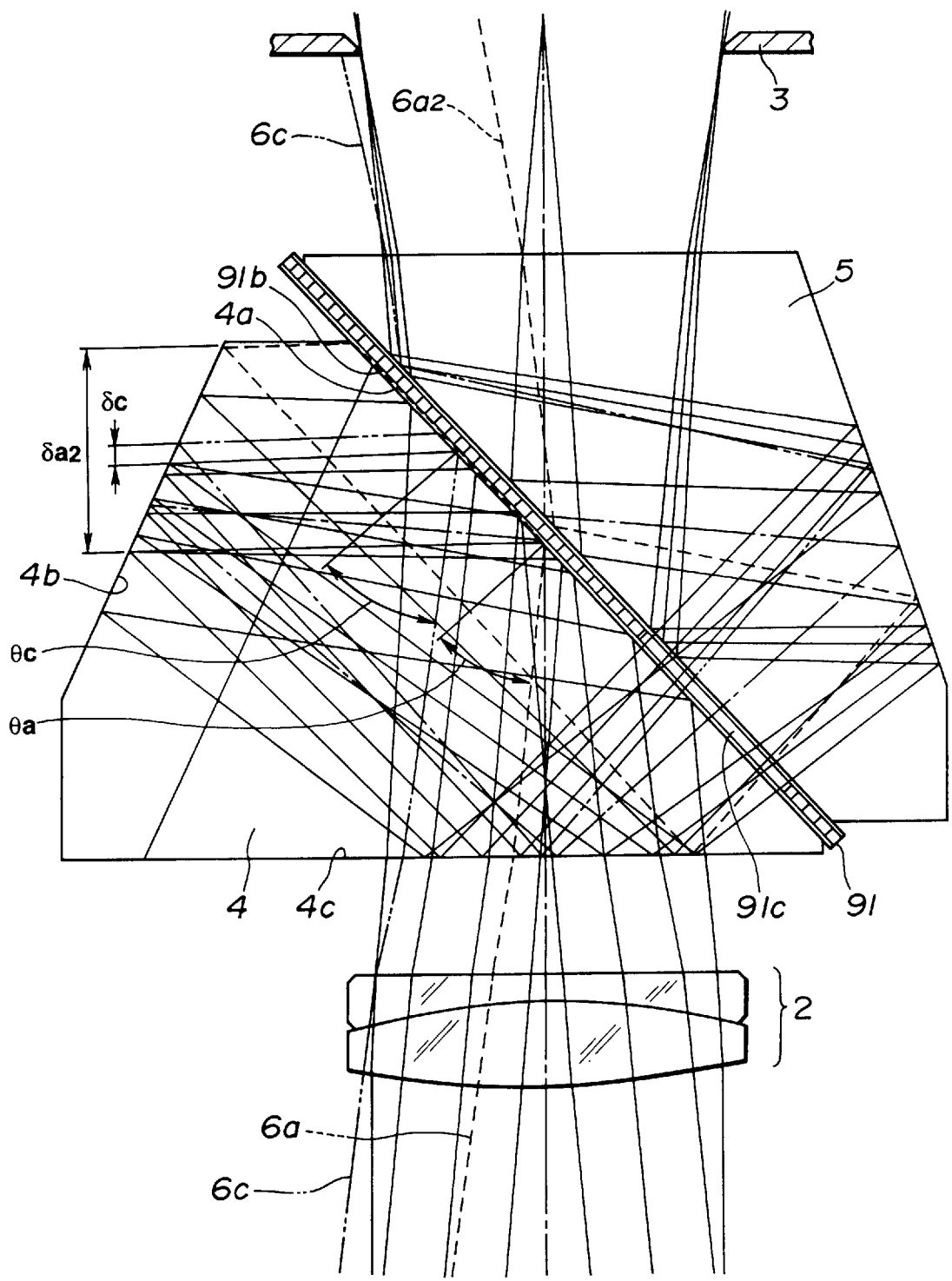
FIG. 13 is a sectional view of the compound prism optical system to which the conventional plate-like member.
Figure 14:
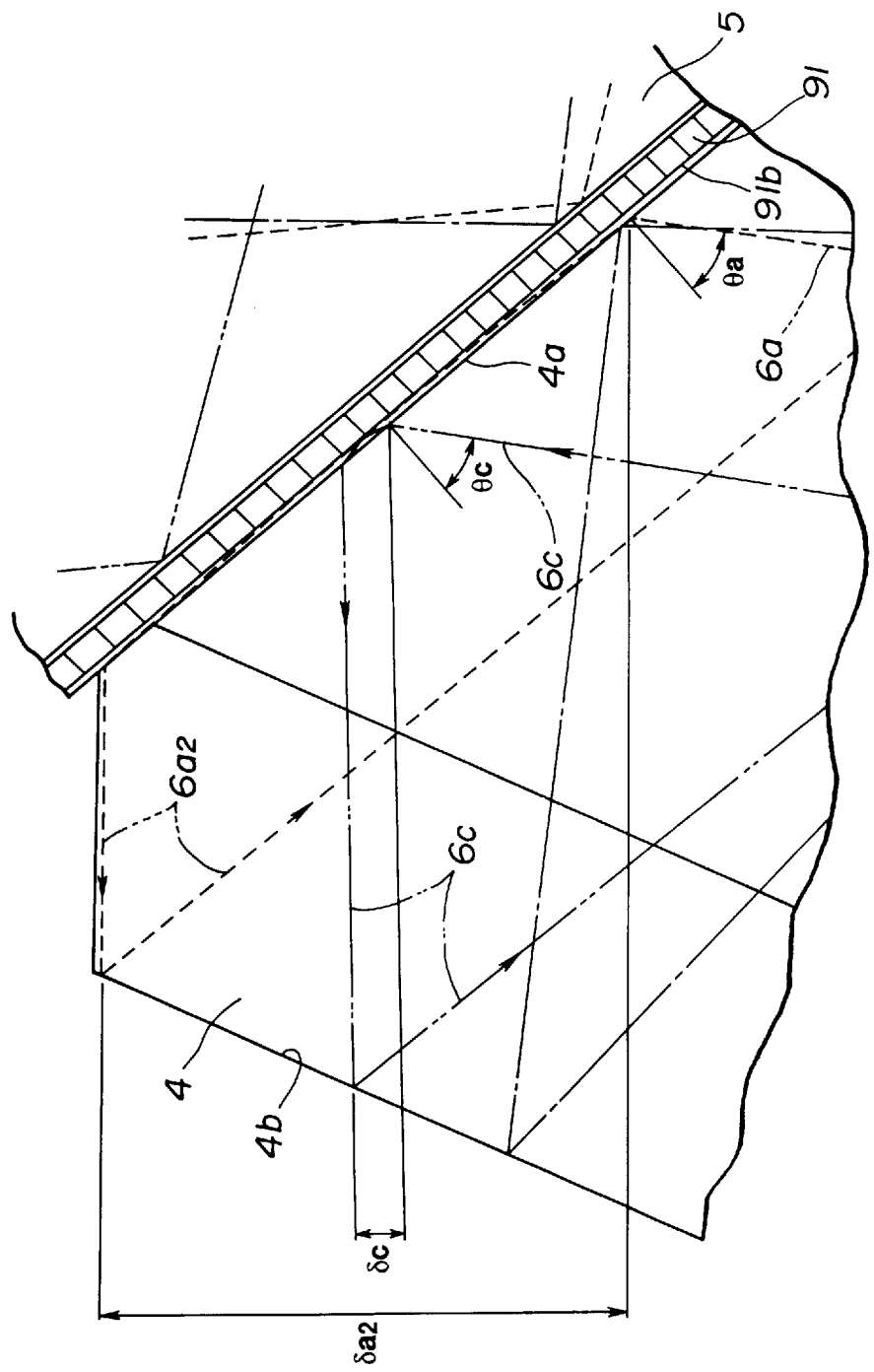
FIG. 14 is an enlarged sectional diagram illustrating how light rays are reflected by the conventional plate-like member.

Here, note that FIG. 1 is drawn in such a way that the angle of incidence $\theta_b$ of the light ray 6b on the first reflection surface 4a is equal to the angle of incidence $\theta_a$ of the light ray 6a of FIGS. 13 and 14.

If the light ray 6c is incident thereon at an angle $\theta_c$ of incidence, which is slightly smaller than this angle $\theta_b$ of incidence, the light ray 6c is shifted by $\delta_c$ from an optical path in the case that the light ray 6c would be reflected on the first reflection surface 4a. Thus, as is seen from FIG. 13, light rays having passed through the objective lens 2 do not enter the field stop 3 at all. Consequently, the system has only to form in the light blocking portion 1b a face (or surface portion) for leading light rays, which are incident on the first reflection surface 4a at angles of incidence $\theta$ satisfying the following condition: $\theta n1 > \theta > \theta_c$, to the outside of the field stop 3.

Incidentally, regarding the unit or component prisms (or sub-prisms) of the Pechan prism, in the case of the aforementioned first embodiment, the first (unit) prism 4 is a Dach-prism, and the second (unit) prism 5 is an auxiliary prism. The unit prisms are not limited thereto. For instance, even in the case that a first prism 7 and a second prism 8 are an auxiliary prism and a Dach-prism, respectively, as shown in FIG. 2B, ghosts and flares due to stray light are similarly prevented by using the aforementioned plate-like member 1.

In accordance with the first embodiment of the present invention, in the case that an intense light source is present outside the real field of view, ghosts and flares, which may be caused owing to stray light, are prevented from occurring or are reduced.

Figure 5B:
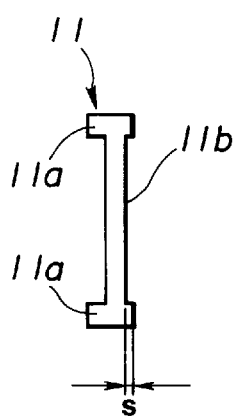
FIG. 5B is a side view of the plate-like member of the second embodiment of the present invention, for illustrating the configuration of this plate-like member.
Figure 5A:
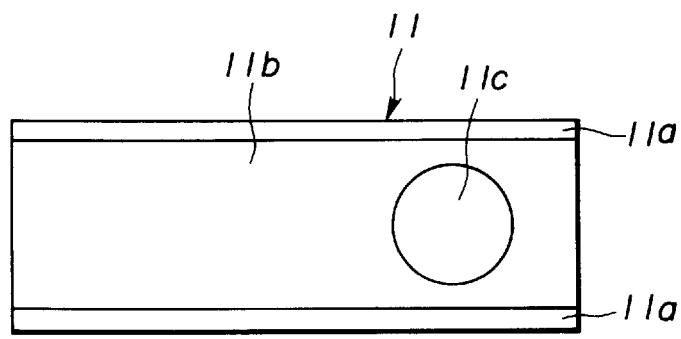
FIG. 5A is a front view of the plate-like member of a second embodiment of the present invention, for illustrating the configuration of this plate-like member.
Figure 6:
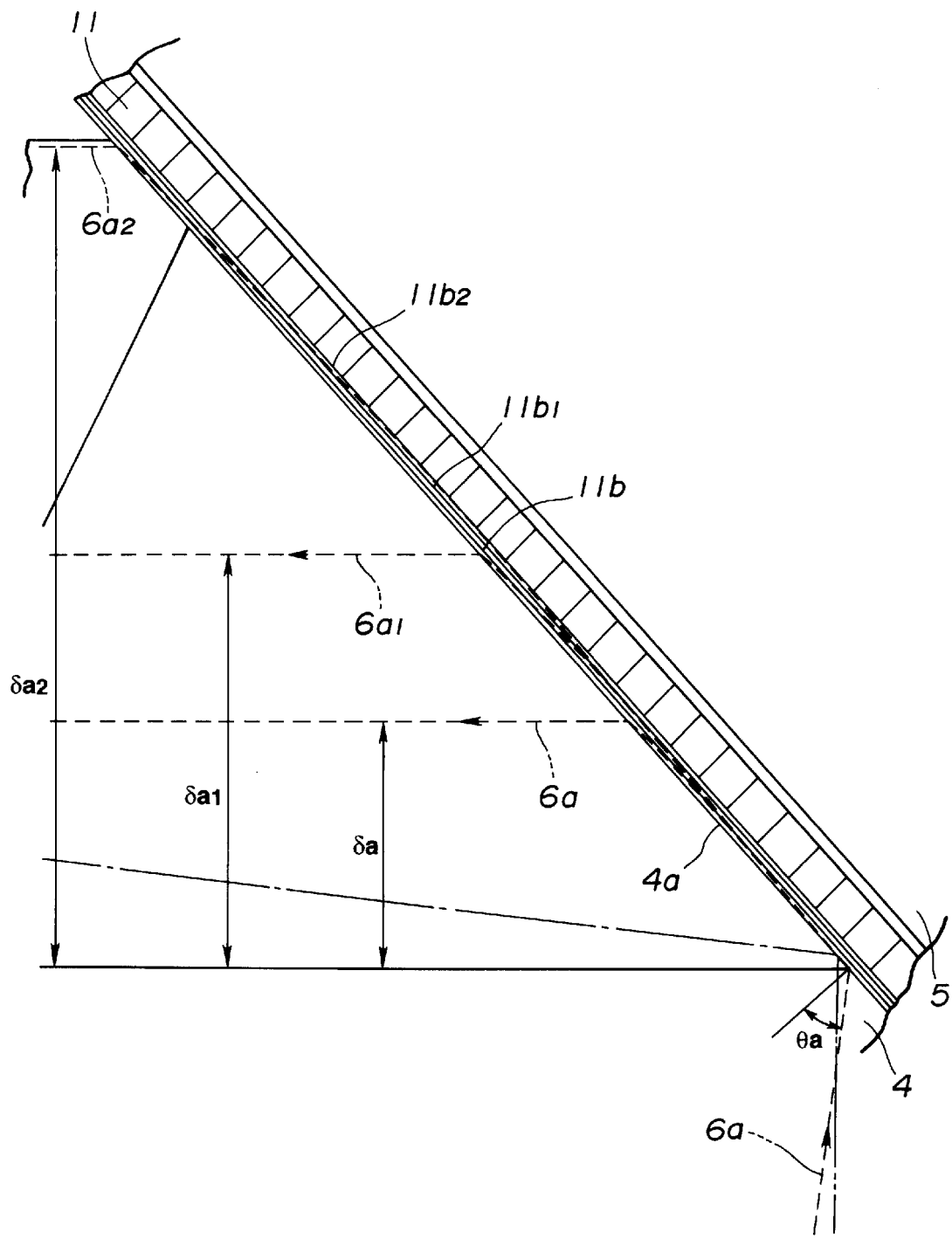
FIG. 6 is a sectional diagram illustrating how light rays are reflected by a plate-like member of the aforesaid second embodiment of the present invention.
Figure 7:
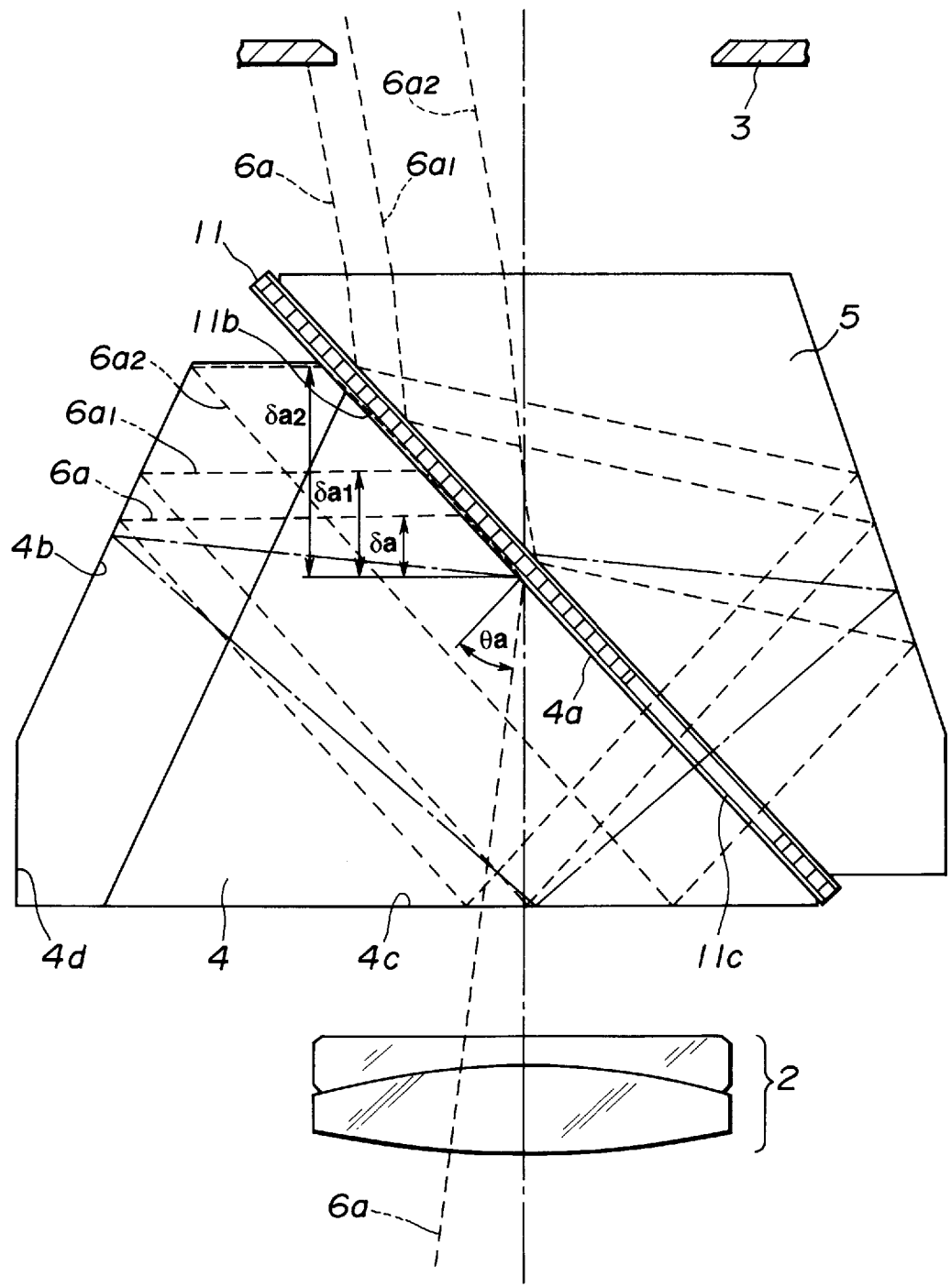
FIG. 7 is a sectional view of a compound prism optical system to which a plate-like member of the second embodiment of the present invention is applied.

FIGS. 5A, 5B, 6 and 7 illustrate the second embodiment of the present invention. FIG. 5A is a front view of the plate-like member of the second embodiment of the present invention, for illustrating the configuration of this plate-like member. FIG. 5B is a side view of the plate-like member of the second embodiment of the present invention, for illustrating the configuration of this plate-like member. FIG. 6 is a sectional diagram illustrating how light rays are reflected by a plate-like member of the aforesaid second embodiment of the present invention. FIG. 7 is a sectional view of a compound prism optical system to which a plate-like member of the second embodiment of the present invention is applied.

Regarding the second embodiment of the present invention, descriptions of composing elements, which are similar to those of the aforementioned first embodiment, are omitted. Further, only the differences between the first and second embodiments of the present invention will be mainly described hereinbelow.

This plate-like member 11 is shaped nearly like a rectangle. Further, a pair of abutting attachment portions 11a are formed along the edge portions of the longer sides of this plate-like member 11, respectively. There is provided a light blocking portion 11b between these abutting attachment portions 11a. Furthermore, a circular diaphragm opening 11c, which is a light transmitting portion, is formed in a side portion of light blocking portion 11b.

The difference s in surface level between the abutting attachment portion 11a and the light blocking portion 11b is not more than 0.05 mm (namely, $s \leq 0.05$ mm) only at one of the sides thereof. In contrast, at the other side thereof, the difference s in surface level therebetween has an ordinary value, namely, for example, 0.1 mm or so. Further, the portions 11a and 11b are placed in such a manner that the surfaces thereof, between which the surface-level difference in level between is not more than 0.05 mm, face the first prism 4. FIG. 6 illustrates a light blocking portion 11b2 at the time when the difference in surface level between the light blocking portion and this abutting attachment portion 11a is 0.1 mm, a light blocking portion 11b1 at the time when the difference in surface level therebetween is 0.05 mm, and a light blocking portion 11b at the time when the difference in surface level therebetween is 0.03 mm, in the case that the plate-like member 11 is in contact with the first reflection surface 4a at the abutting attachment portion 11a.

An amount of shift of the light ray 6a2, which is caused by the light blocking portion 11b2, is $\delta a2$. In contrast, an amount of shift of the light ray 6a, which is caused by the light blocking portion 11b, is $\delta a$ (=0.3 $\delta a2$).

Thus, as illustrated in FIG. 7, the light ray 6a2 enters the vicinity of the relatively central portion of the field stop 3. The light ray 6a1 still enters a place in the field stop 3, though this place is in a peripheral portion thereof in comparison with the case of the light ray 6a2. The light ray 6a, however, is outside the field stop 3. Thus, by setting the difference in surface level between the abutting attachment portion 11a and the light blocking portion 11b as above described, ghosts and flares are prevented from occurring.

Incidentally, in the case of FIG. 7, the light ray 6a1, which has been reflected by the light blocking portion 11b1 and further shifted by $\delta a1$, is still in the field stop 3. However, some of light rays, whose angle of incidence on the first reflection surface 4a is smaller than the illustrated angle of incidence $\theta_a$, can be fully prevented by the light blocking portion 11b1, which corresponds to the case that the difference in surface level is 0.05 mm, from entering the field stop 3.

Thus, when ordinarily or commonly used outdoors, ghosts or flares due to stray light are inconspicuous by setting the difference in surface level between the abutting attachment portion 11a and the light blocking portion 11b at a value which is not more than 0.05 mm. Consequently, there are practically presented no problems.

Moreover, when intense illumination is provided outside the field of view under usage conditions that ghosts and flares are liable to attract attention, for example, in the case of seeing a play indoors, ghosts or flares due to stray light are made to be inconspicuous by setting the difference in surface level between the abutting attachment portion 11a and the light blocking portion 11b at a value which is not more than 0.03 mm.

In accordance with the second embodiment of the present invention, advantages or effects similar to those of the aforementioned first embodiment of the present invention are obtained by setting the thickness of the air layer formed between the first reflection surface of the first prism and the plate-like member at a quantity which is not more than a predetermined quantity.

FIGS. 8A and 8B illustrate the third embodiment of the present invention. FIG. 8A is a front view of the plate-like member of the third embodiment of the present invention, for illustrating the configuration of the plate-like member. FIG. 8B is a side view of the plate-like member of the third embodiment of the present invention, for illustrating the configuration of the plate-like member. Regarding the third embodiment of the present invention, descriptions of composing elements, which are similar to those of the aforementioned first and second embodiments, are omitted. Further, only the differences between the third embodiment and each of the first and second embodiments of the present invention will be mainly described hereinbelow.

The plate-like member 21 is shaped nearly like a rectangle. Further, a pair of abutting attachment portions 21a are formed along the edge portions of the longer sides of plate-like member 21, respectively. There is provided a light blocking portion 21b between abutting attachment portions 21a. Furthermore, a circular diaphragm opening 21c, which is a light transmitting portion, is formed in a side portion of this light blocking portion 21b.

On the blocking portion 21b, a plurality of consecutively arranged light blocking lines are formed. More particularly, depressions and projections, each of which is elongate in the longitudinal direction of the blocking portion 1b and having a section shaped nearly like a letter "V" or an "inverted V", respectively, are provided in parallel with one another along the transverse direction. Thus, as shown in FIG. 8B, the entire portion consisting of these depressions and projections has a section which is almost serrate.

The angles of inclination of the inclined faces are set in such a manner that light rays causing ghosts or flares are led to the outside of the field stop 3, respectively.

In accordance with such a third embodiment of the present invention, advantages or effects similar to those of the aforementioned first and second embodiments of the present invention are obtained.

FIGS. 9A and 9B illustrate the fourth embodiment of the present invention. FIG. 9A is a front view of the plate-like member of the fourth embodiment of the present invention, for illustrating the configuration of the plate-like member. FIG. 9B is a side view of the plate like member of the fourth embodiment of the present invention, for illustrating the configuration of the plate-like member. Regarding the fourth embodiment of the present invention, descriptions of composing elements, which are similar to those of the aforementioned first to third embodiments, are omitted. Further, only the differences between the fourth embodiment and each of the first to third embodiments of the present invention will be mainly described hereinbelow.

The plate-like member 31 is shaped nearly like a rectangle. Further, a pair of abutting attachment portions 31a are formed along the edge portions of the longer sides of plate-like member 31, respectively. There is provided a light blocking portion 31b between these abutting attachment portions 31a. Furthermore, a circular diaphragm opening 31c, which is a light transmitting portion, is formed in a side portion of light blocking portion 31b.

The differences p and q in surface level on both sides between the abutting attachment portion 31a and the light blocking portion 31b are set in such a manner as to be equal to or less than 0.05 mm correspondingly to the sides of the portion 31 respectively facing the first prism 4 and the second prism 5.

In accordance with such a fourth embodiment of the present invention, advantages or effects similar to those of the aforementioned second embodiment of the present invention are obtained. Moreover, the necessity of differentiating the front surface of the plate-like member from the rear or back surface thereof is eliminated. Furthermore, the fabrication of the system can be facilitated.

FIGS. 1A and 10B illustrate the fifth embodiment of the present invention. FIG. 10A is a front view of the plate-like member of the fifth embodiment of the present invention, for illustrating the configuration of the plate-like member. FIG. 10B is a sectional view of the plate-like member of the fifth embodiment of the present invention, for illustrating the configuration of the plate-like member. Regarding this fifth embodiment of the present invention, descriptions of composing elements, which are similar to those of the aforementioned first to fourth embodiments, are omitted. Further, only the differences between the fifth embodiment and each of the first to fourth embodiments of the present invention will be mainly described hereinbelow.

The plate-like member 41 is shaped nearly like a rectangle. Further, a pair of abutting attachment portions 41a are formed along the edge portions of the longer sides of plate-like member 41, respectively. There is provided a light blocking portion 41b between abutting attachment portions 31a. Furthermore, a circular diaphragm opening 41c, which is a light transmitting portion, is formed in a side portion of light blocking portion 41b.

As shown in FIG. 10B, the light blocking portion 41b is formed in such a way as to be inclined in the longitudinal direction to the abutting attachment portion 41a. The angles of inclination of the aforesaid inclined faces are set in such a manner that correspondingly to angles at which light rays causing ghosts or flares are incident on the light blocking portion 41b, the light rays are led to the outside of the field stop 3, respectively.

In accordance with such a fifth embodiment of the present invention, advantages or effects, which are nearly similar to those of the aforementioned first to fourth embodiments of the present invention, are obtained.

Figure 11A:
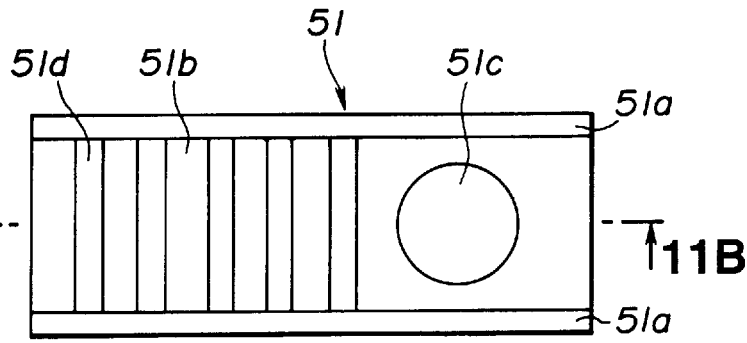
FIG. 11A is a front view of the plate-like member of a sixth embodiment of the present invention, for illustrating the configuration of this plate-like member.
Figure 11B:
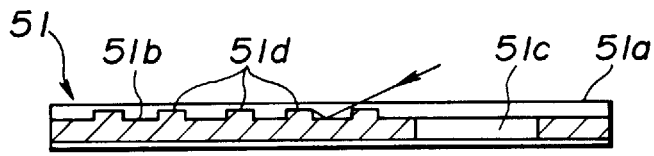
FIG. 11B is a sectional view of the plate-like member of the sixth embodiment of the present invention, for illustrating the configuration of this plate-like member.
Figure 12A:
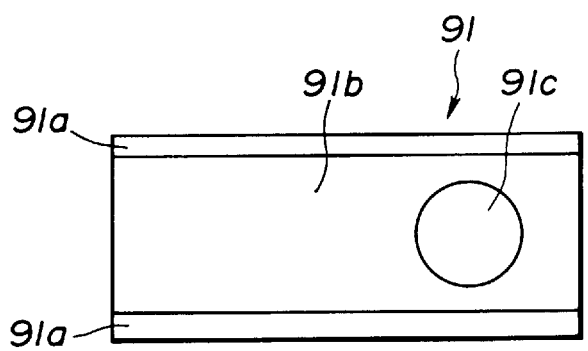
FIG. 12A is a front view of the conventional plate-like member.
Figure 12B:
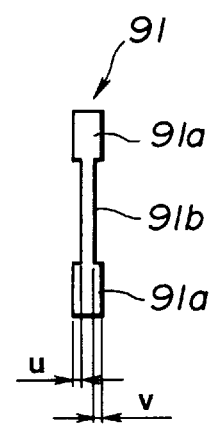
FIG. 12B is a side view of the conventional plate-like member.

FIGS. 11A and 11B illustrate the sixth embodiment of the present invention. FIG. 11A is a front view of the plate-like member of the sixth embodiment of the present invention, for illustrating the configuration of the plate-like member. FIG. 11B is a sectional view of the plate-like member of the sixth embodiment of the present invention, for illustrating the configuration of the plate-like member. Regarding the sixth embodiment of the present invention, descriptions of composing elements, which are similar to those of the aforementioned first to fifth embodiments, are omitted. Further, only the differences between the sixth embodiment and each of the first to fifth embodiments of the present invention will be mainly described hereinbelow.

The plate-like member 51 is shaped nearly like a rectangle. Further, a pair of abutting attachment portions 51a are formed along the edge portions of the longer sides of plate-like member 51, respectively. There is provided a light blocking portion 51b between abutting attachment portions 51a. Furthermore, a circular diaphragm opening 51c, which is a light transmitting portion, is formed in a side portion of light blocking portion 51b.

On the blocking portion 51b, a plurality of consecutively arranged light blocking lines are formed. More particularly, a plurality of light blocking walls 51d, each of which is elongate in the transverse direction of the blocking portion 51b, are arranged along the longitudinal direction in such a manner as to protrude from the blocking portion 51b. Thereby, light rays, which have a large amount of shift and cause ghosts and flares, are cut as illustrated in FIG. 11B.

In accordance with such a sixth embodiment of the present invention, advantages or effects, which are nearly similar to those of the aforementioned first to fifth embodiments of the present invention, are obtained.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A compound prism optical system comprising:
   first and second prisms; and
   a plate-like member interposed between said first and second prisms to provide a predetermined air space therebetween and which has: a light transmitting portion for transmitting light rays; and a light blocking portion for blocking light rays, wherein a light ray, which has been incident on said first prism and then passed through said light transmitting portion, is emitted from said second prism,
   wherein a plurality of continuous protrusion and depression faces are formed in said light blocking portion of said plate-like member and are separated from one of said prisms by said air space.

2. The compound prism optical system according to claim 1, which further comprises a field stop for restricting a path followed by a light ray, which has been incident on said first prism and then has passed through said light transmitting portion and has been further emitted from said second prism, to a range which is necessary for forming an image.

3. The compound prism optical system according to claim 2, wherein said first and second prisms are two component prisms composing a Pechan prism.

4. The compound prism optical system according to claim 2, wherein said first and second prisms compose a finder of an optical instrument.

5. The compound prism optical system according to claim 2, wherein said plate-like member is a substantially rectangular-shaped member having abutting attachment portions, which are respectively attached to said prisms and are formed on edge portions, said light blocking portion being formed between said abutting attachment portions.

6. The compound prism optical system according to claim 2, wherein adjacent ones of said depressions and projections each form a diagonally aligned surface, an angle of inclination of each of said diagonally aligned surfaces is set in such a manner that light rays causing ghosts or flares are led outside of said field stop.

7. A compound prism optical system comprising:
   first and second prisms; and
   a plate-like member interposed between said first and second prisms to provide a predetermined air space therebetween and which has: a light transmitting portion for transmitting light rays; and a light blocking portion for blocking light rays, wherein a light ray, which has been incident on said first prism and then passed through said light transmitting portion, is emitted from said second prism,
   wherein a thickness of an air space between said light blocking portion and at least one of a surface of said first prism and a surface of said second prism, which face said plate-like member, is set at a value which is not more than 0.05 mm.

8. The compound prism optical system according to claim 7, which further comprises a field stop for restricting a path followed by a light ray, which has been incident on said first prism and then has passed through said light transmitting portion and has been further emitted from said second prism, to a range which is necessary for forming an image.

9. The compound prism optical system according to claim 7, wherein said first and second prisms are two component prisms composing a Pechan prism.

10. The compound prism optical system according to claim 7, wherein said first and second prisms compose a finder of an optical instrument.

11. The compound prism optical system according to claim 7, wherein said plate-like member is a substantially rectangular-shaped member having abutting attachment portions, which are respectively attached to said prisms and are formed on edge portions of said member, said light blocking portion being formed between said abutting attachment portions.

12. The compound prism optical system according to claim 8, wherein said light blocking portion is aligned transverse to at least one of the surfaces of said first prism and said second prism, which face said plate-like member.

13. A compound prism optical system for observing an object, said compound prism optical system comprising:
   first and second optical prisms, which are combined with each other in such a manner that an air space having a predetermined thickness is provided between predetermined surfaces of said first and second optical prisms, and a field stop for restricting a path followed by a light ray, which has been incident on said first prism and then has passed through a light transmitting region and has been further emitted from said second prism, to a range which is necessary for forming an image, the predetermined surface of each of said first and second prisms having a total-reflection region adapted to be able to totally reflect a light ray and further having a light transmitting region for transmitting a light ray,
   said prism optical system further comprising a plate-like member which is placed in such a manner as to establish the predetermined air space between said first and second prisms and which has a light transmitting window and a light blocking portion; and
   stray-light preventing means provided on a surface of said light blocking portion of said plate-like member in such a way as to face at least one of the predetermined surfaces of said first and second prisms and being separated from said at least one of the surfaces by said air space,
   wherein said stray-light preventing means prevents light rays, which are transmitted by said total-reflection region and then reflected on a surface of said plate-like member, from passing through said field stop.

14. The compound optical system according to claim 13, wherein said stray-light preventing means of said light blocking portion comprises a plurality of continuous inclined faces, said air space separating said faces from said prisms.

15. The compound prism optical system according to claim 13, wherein said stray-light preventing means of said light blocking portion has a surface inclined relative to the surface of said prism facing said plate-like member, forming a tapering air space.

16. The compound prism optical system according to claim 13, wherein said light blocking portion has a plurality of consecutively arranged light blocking lines spaced from said prisms by said air space.

17. A compound prism optical system comprising first and second optical prisms, which are combined with each other in such a manner that an air space having a predetermined thickness is provided between predetermined surfaces of said first and second optical prisms, wherein a light ray having been incident on said first prism is emitted from said second prism, said prism optical system further comprising a plate-like member which is placed in such a manner as to establish said predetermined air space between said first and second prism and which has a light transmitting portion and a light blocking portion; and stray-light preventing means provided on a surface of said light blocking portion of said plate-like member in such a way as to face one of the predetermined surfaces of said first prism said stray-light preventing means being separated from said one predetermined prism surface.

18. The compound prism optical system according to claim 17, wherein said first prism has a total reflection part, wherein said stray-light preventing means prevents a light ray, which has been transmitted by said total reflection part and has been reflected on a surface of said plate-like member, from passing through said light transmitting portion.

19. A prism optical apparatus for guiding a light ray, which represents an image of an object to be observed, to an observer, comprising:

a prism;

a member which is placed in such a manner that a thickness of an air space provided between said member and said prism along a length of said member is non-uniform and has a light transmitting portion and a light blocking portion.

20. A compound prism optical system according to claim 7 wherein another one of a surface of said first and second prisms is separated from said plate-like member by a distance set at a value which is of the order of 0.01 mm.

21. A compound prism optical system according to claim 20 wherein a surface of the light blocking portion spaced from said one of said first and second prisms by value $s \geq 0.05$ mm has a serrate surface.

* * * * *

UNITED STATES PATENT AND TRADEMARK OFFICE
CERTIFICATE OF CORRECTION

PATENT NO. : 5,835,276
DATED : November 10, 1998
INVENTOR(S) : Asai et al.

It is certified that error appears in the above-identified patent and that said Letters Patent is hereby corrected as shown below:

In the title & Col.1, Line 3 delete " Plares" and insert --flares--.

Col. 4, line 42, delete "this".

Col. 7, line 57, delete "these".

Col. 8, line 8, delete "1A" and insert --10A--.

Signed and Sealed this

Eighteenth Day of May, 1999

Attest:

Attesting Officer

Q. TODD DICKINSON

Acting Commissioner of Patents and Trademarks